US009376114B2

(12) United States Patent
Hemphill

(10) Patent No.: US 9,376,114 B2
(45) Date of Patent: Jun. 28, 2016

(54) SYNCHRONIZED ACCESSORY DEVICES DRIVE SYSTEM WITH OPTIMIZED SWITCHING BETWEEN DRIVE SOURCES FOR THE DRIVE SYSTEM

(71) Applicant: Schaeffler Technologies AG & Co. KG, Herzogenaurach (DE)

(72) Inventor: Jeffrey Hemphill, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/613,026

(22) Filed: Feb. 3, 2015

(65) Prior Publication Data

US 2015/0274167 A1 Oct. 1, 2015

Related U.S. Application Data

(60) Provisional application No. 61/972,530, filed on Mar. 31, 2014.

(51) Int. Cl.

| | |
|---|---|
| ***B60W 10/08*** | (2006.01) |
| ***B60W 30/188*** | (2012.01) |
| ***B60W 10/06*** | (2006.01) |
| ***B60W 10/02*** | (2006.01) |
| ***B60W 10/11*** | (2012.01) |
| ***B60W 10/30*** | (2006.01) |

(52) U.S. Cl.

CPC ........... *B60W 30/1886* (2013.01); *B60W 10/02* (2013.01); *B60W 10/06* (2013.01); *B60W 10/11* (2013.01); *B60W 10/30* (2013.01); *Y10T 477/26* (2015.01); *Y10T 477/328* (2015.01)

(58) Field of Classification Search

None

See application file for complete search history.

(56) References Cited

U.S. PATENT DOCUMENTS

| | | | | |
|---|---|---|---|---|
| 5,943,918 A | | 8/1999 | Reed, Jr. et al. | |
| 6,048,288 A | * | 4/2000 | Tsujii | B60H 1/3222 180/65.25 |
| 6,464,028 B1 | | 10/2002 | Imani | |
| 6,524,218 B1 | * | 2/2003 | Yamada | B60K 6/48 180/65.1 |
| 6,793,059 B2 | * | 9/2004 | Okada | B60K 25/02 123/179.4 |
| 6,796,367 B2 | | 9/2004 | Blacquiere et al. | |
| 7,099,768 B2 | * | 8/2006 | Moriya | B60K 6/48 123/179.4 |
| 7,695,400 B2 | * | 4/2010 | McGee | B60K 6/445 477/5 |
| 8,221,284 B2 | * | 7/2012 | Asao | B60K 6/485 180/53.8 |
| 8,770,327 B2 | * | 7/2014 | Yamada | B60K 6/383 180/65.22 |

(Continued)

FOREIGN PATENT DOCUMENTS

| | | |
|---|---|---|
| EP | 1097831 | 5/2001 |
| JP | 2004098853 | 4/2004 |

(Continued)

*Primary Examiner* — Dirk Wright

(74) *Attorney, Agent, or Firm* — Simpson & Simpson, PLLC

(57) ABSTRACT

An accessories drive system, including: a accessory device; and a clutch assembly including: an electric machine; a drive shaft connected to the machine and accessory device; at least one clutch; and a control unit to: connect, using the clutch, the drive shaft to the crankshaft or the input shaft; rotate the drive shaft with the crankshaft or the input shaft; disconnect, using the clutch, the drive shaft from the crankshaft or the input shaft; accelerate or decelerate, using the machine, rotation of the drive shaft at a first absolute rate less than a second absolute rate of acceleration or deceleration of the engine or the input shaft; and when a speed of rotation of the drive shaft is within a predetermined range of a speed of rotation of the crankshaft or the input shaft, close the clutch to engage the drive shaft with the crankshaft or the input shaft.

20 Claims, 3 Drawing Sheets

(56) References Cited

U.S. PATENT DOCUMENTS

| | | | | |
|---|---|---|---|---|
| 8,939,240 | B2 * | 1/2015 | Wehrwein | B60K 25/00 180/53.5 |
| 2014/0290406 | A1 | 10/2014 | Hemphill | |

FOREIGN PATENT DOCUMENTS

| | | |
|---|---|---|
| JP | 2004263655 | 9/2004 |
| JP | 2002228295 | 8/2008 |

* cited by examiner

SYNCHRONIZED ACCESSORY DEVICES DRIVE SYSTEM WITH OPTIMIZED SWITCHING BETWEEN DRIVE SOURCES FOR THE DRIVE SYSTEM

CROSS-REFERENCE TO RELATED APPLICATIONS

This application claims the benefit under 35 U.S.C. §119 (e) of U.S. Provisional Patent Application No. 61/972,530, filed Mar. 31, 2014, which application is incorporated herein by reference in its entirety.

TECHNICAL FIELD

The present disclosure relates to a system for driving accessory devices for a vehicle, in particular, a system driving the accessory devices using an output of a crankshaft, a transmission shaft, or an electric machine and configured to optimize switching between the respective outputs of the crankshaft, the transmission shaft, and the electric machine.

BACKGROUND

Commonly-owned U.S. patent application Ser. No. 14/049,532 discloses a synchronized accessory devices drive system providing power to an accessory drive shaft from an electric machine or from a crankshaft of transmission input shaft. However, to track speed changes of the crankshaft or input shaft beyond a certain level, the capacity of the electric machine must be increased, which in turn increases battery and electronics requirements. In addition, belt tension requirements must be increased. The preceding requirements result in increased cost and complexity and lower fuel efficiency.

SUMMARY

According to aspects illustrated herein, there is provided an accessories drive system for a vehicle, including: at least one accessory device; and a clutch assembly including: an electric machine; a drive shaft connected to the electric machine and the at least one accessory device and arranged to provide torque to the at least one accessory device; at least one clutch arranged to connect and disconnect the drive shaft with respect to an input shaft for a transmission for the vehicle or a crankshaft for an engine for the vehicle; and at least one control unit, configured to connect, using at least one clutch, the drive shaft to the crankshaft or the input shaft, rotate the drive shaft with the crankshaft or the input shaft, disconnect, using the at least one clutch, the drive shaft from the crankshaft or the input shaft, respectively, accelerate or decelerate, using the electric machine, rotation of the drive shaft at a first absolute rate less than a second absolute rate of acceleration or deceleration of the engine, and when a speed of rotation of the drive shaft is within a predetermined range of a speed of rotation of the crankshaft or the input shaft, close the at least one clutch to engage the drive shaft with the crankshaft or the input shaft.

According to aspects illustrated herein, there is provided an accessories drive system for a vehicle, including: at least one accessory device; and a clutch assembly including: an electric machine; a drive shaft connected to the at least one accessory device and arranged to provide torque to the at least one accessory device; at least one clutch arranged to connect and disconnect the drive shaft with respect to an input shaft for a transmission for the vehicle or a crankshaft for an engine for the vehicle; and at least one control unit. The control unit is configured to: when a rotational speed for the engine is below a threshold value, disconnect, using the at least one clutch, the drive shaft from the crankshaft and the input shaft and rotate the drive shaft with using the electric machine; accelerate the engine; and when a speed of rotation of the drive shaft matches a speed of rotation of the crankshaft or the input shaft, close the at least one clutch to engage the drive shaft with the crankshaft or the input shaft.

According to aspects illustrated herein, there is provided an accessories drive system for a vehicle, including: at least one accessory device; and a clutch assembly including: an electric machine; a drive shaft connected to the at least one accessory device and arranged to provide torque to the at least one accessory device; first and second clutches; and at least one control unit, configured to: accelerate rotation of the crankshaft; connect, using the first clutch, the drive shaft to the crankshaft or the input shaft; non-rotatably connect, using the second clutch, the crankshaft and the input shaft; rotate, using the electric machine, the drive shaft with the crankshaft or the input shaft; detect a first absolute rate of acceleration or deceleration of the crankshaft rotation greater than a threshold value, or receive a gear shift signal from the transmission; disconnect, in response to detecting the first absolute rate or receiving the gear shift signal and using the first clutch, the drive shaft from the crankshaft or the input shaft; initiate the gear shift for the transmission; accelerate or decelerate, using the electric machine, rotation of the drive shaft at a second absolute rate less than the first absolute rate; and when a speed of rotation of the drive shaft matches a speed of rotation of the crankshaft or the input shaft, close the first clutch to engage the drive shaft with the crankshaft or the input shaft.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
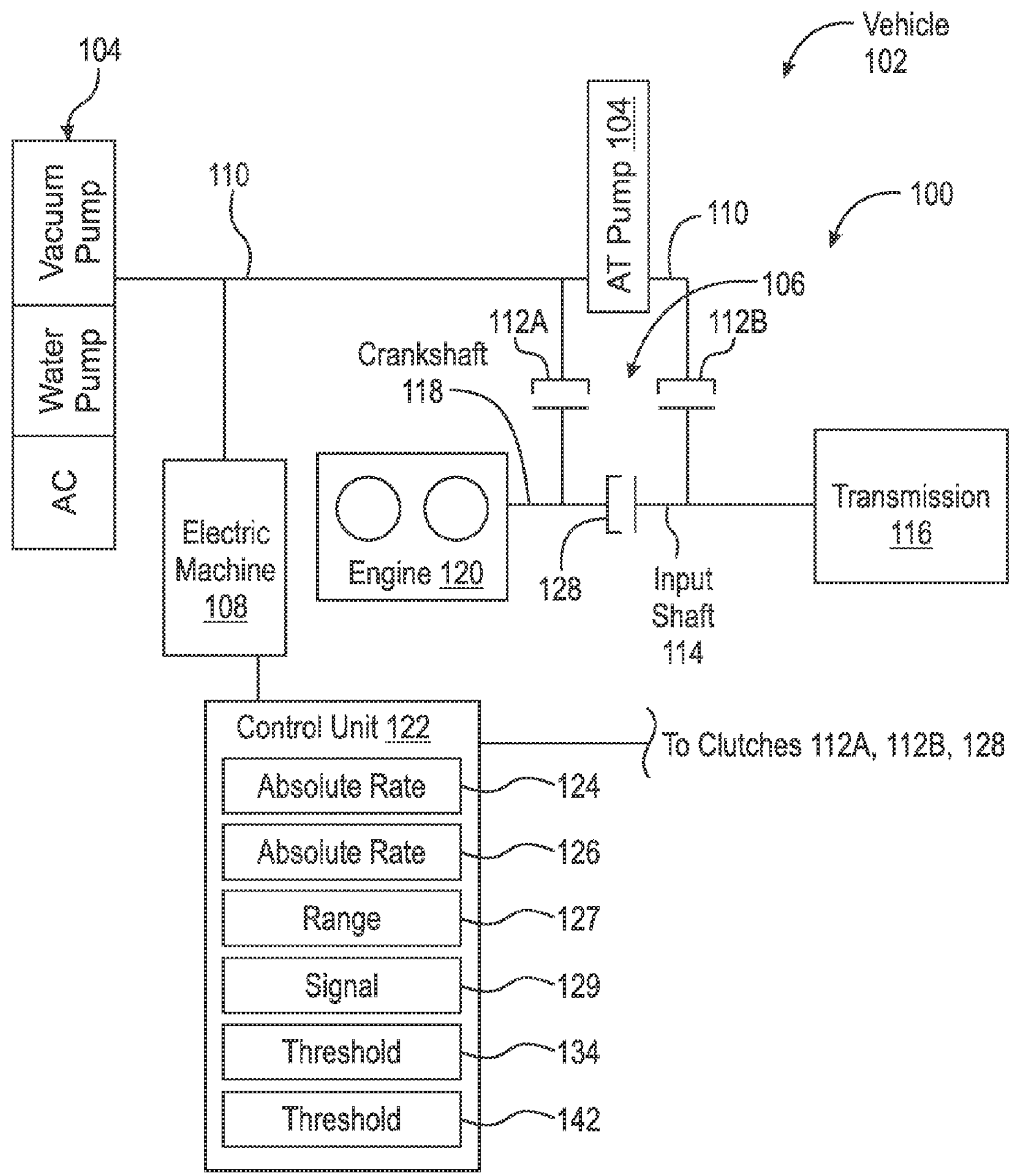
FIG. 1 is a schematic block diagram of a vehicle with an accessories drive system.

FIG. 1 is a schematic block diagram of a vehicle with accessories drive system 100. Drive system 100 for vehicle 102 includes at least one accessory device 104 and clutch assembly 106 with electric machine 108 and drive shaft 110 connected to accessory device(s) 104. Shaft 110 is arranged to provide torque to accessory device(s) 104. Assembly 106 includes at least one clutch 112 arranged to connect and disconnect drive shaft 110 with respect to input shaft 114 for transmission 116 for vehicle, or arranged to connect and disconnect drive shaft 110 with respect to crankshaft 118 for engine 120 for the vehicle. In an example embodiment, assembly 106 includes a single clutch 112A between drive shaft 110 and crankshaft 118. The discussion that follows is directed to a single clutch 112A connecting drive shaft 110 and crankshaft 118, although it should be understood the discussion is applicable to more than one clutch 112. Assembly 106 includes at least one control unit 122, configured to: connect, using clutch 112A, drive shaft 110 crankshaft 118 or input shaft 114; rotate drive shaft 110 with crankshaft 118 or input shaft 114; and disconnect, using clutch 112A, drive shaft 110 from crankshaft 118 or input shaft 114. Unit(s) 122 is configured to accelerate or decelerate, using electric machine 108, rotation of drive shaft 110 at absolute rate 126 less than absolute rate of acceleration or deceleration 124 for the crankshaft or input shaft; and when a speed of rotation of the drive shaft is within predetermined range 127 of a speed of rotation of crankshaft 118 or input shaft 114, close clutch 112A to engage drive shaft 110 with crankshaft 118 or input shaft 114.

In an example embodiment, assembly 106 includes clutch 128 arranged to non-rotatably connect crankshaft 118 and input shaft 114. In an example embodiment, range 127 includes the speed of rotation of crankshaft 118 or input shaft 114 substantially matching the speed of rotation of drive shaft 110. In an example embodiment, control unit 122 is configured to detect absolute rate 124 and disconnect, using clutch 112A, drive shaft 110 from crankshaft 118 or input shaft 114 when rate 124 is greater than threshold 134. In an example embodiment, control unit 122 is configured receive gear shift signal 129 from the transmission and disconnect, using clutch 112A, drive shaft 110 from crankshaft 118 or input shaft 114 in response to receiving signal 129. Signal 129 indicates that the transmission is initiating a gear shift. As described below, the difference in rates 124 and 126 can occur during a gear shift.

Figure 2A:
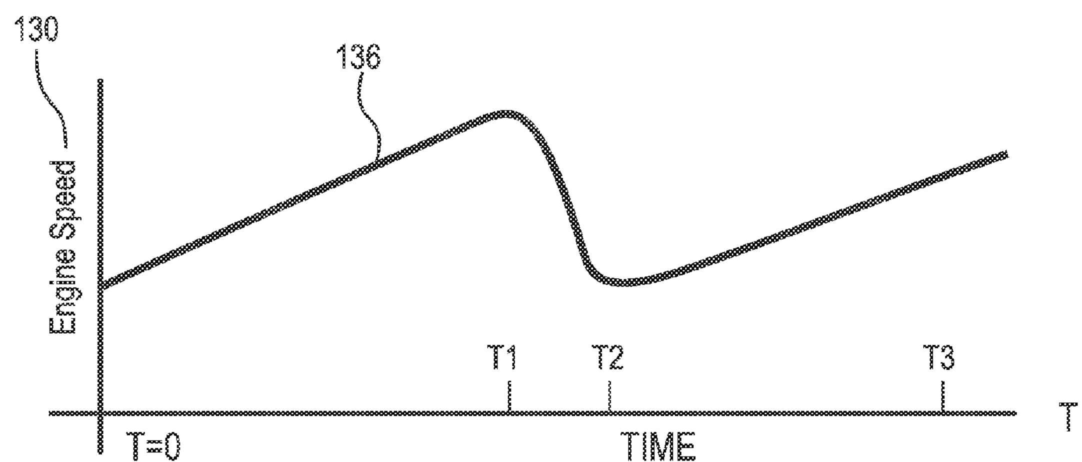
FIG. 2A is a graph showing engine rotational speed for a gear shift.

FIG. 2A is a graph showing example engine rotational speed 130 versus time T for a gear shift.

Figure 2B:
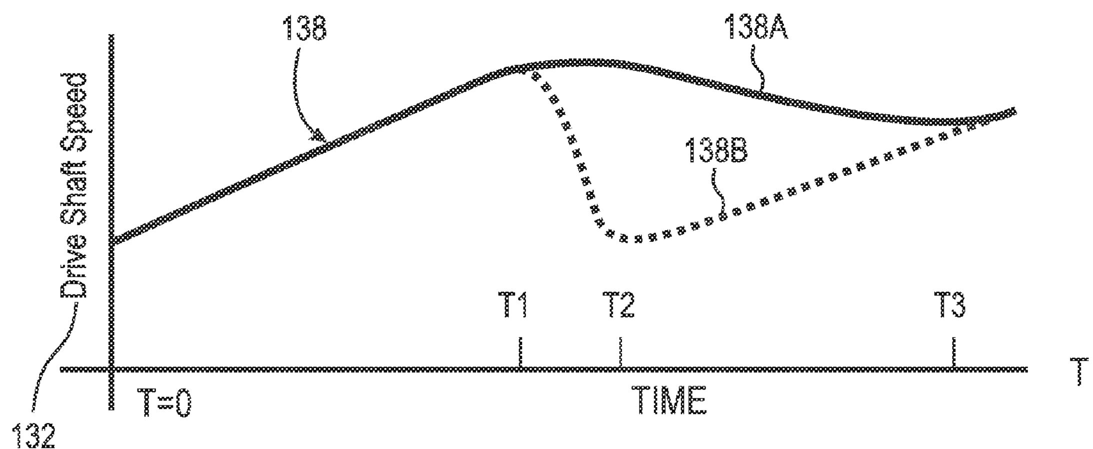
FIG. 2B is a graph showing accessory drive shaft speed for a gear shift.

FIG. 2B is a graph showing example accessory drive shaft speed versus time T for a gear shift. The operations described above for FIG. 1 are explained further using FIGS. 2A and 2B and the configuration shown in FIG. 1. From T=0 to time T1, engine speed 130 increases, for example, as vehicle 102 accelerates in a particular gear. During this time period, clutch 112A is closed so that crankshaft 118 or input shaft 114 provides power to drive shaft 110. Control unit 122 initiates a shift operation for transmission 116 at time T1. As a result, there is a sharp deceleration of engine speed. Control unit 122 monitors engine speed 130 and determines that the deceleration starting at time T1 reaches rate 124, for example, unit 122 compares an absolute value acceleration and deceleration of engine speed 130 to threshold 134 and flags any absolute value acceleration and deceleration of engine speed 130 greater than threshold 134.

Once rate 124 is detected, unit 122 opens clutch 112A to disconnect drive shaft 110 from crankshaft 118 or input shaft 114 and uses electric machine 108 to accelerate or decelerate drive shaft 110 at a lower absolute value, as shown in portion 138A of function 138. If clutch 112A is not opened, the speed and acceleration of drive shaft 110 is shown by portion 138B. For example, the absolute value of the slope of function 138 from T=0 to T1 is less than the absolute value of the slope of function 138B from T1 to T2. Starting at time T2, the slope of function 138 increases and the slope of function 136 decreases until speeds 130 and 132 are substantially equal at time T3, at which time unit 122 closes clutch 112A so that crankshaft 118 or input shaft 114 are again providing power to drive shaft 110. As noted above, the sharper deceleration of function 138B would require an undesirable increase in electric machine capacity, battery and electronics requirements, and belt tension requirements.

Thus, unit 122 initiates a gear shift for the transmission proximate, for example immediately before or after or concurrent with, the disconnection of drive shaft 110 from crankshaft 118 or input shaft 114. In an example embodiment, unit 122 is configured to complete the gear shift prior to closing clutch 112A to engage drive shaft 110 with crankshaft 118 or input shaft 114. As shown above, crankshaft 118 or input shaft 114 is arranged to accelerate or decelerate drive shaft 110 at an absolute rate, for example shown by the slope of function 136 from T=0 to T1, less than the absolute rate between T1 and T2.

In an example embodiment, assembly 106 includes clutch 112B connecting drive shaft 110 and input shaft 114. Note that when clutch 128 is closed, closing either of clutches 112A or 112B provides the same power to drive shaft 110. However, with clutch 128 open and clutch 112B closed, power from the transmission is delivered to drive shaft 110 free of a connection to crankshaft 118.

Figure 3A:
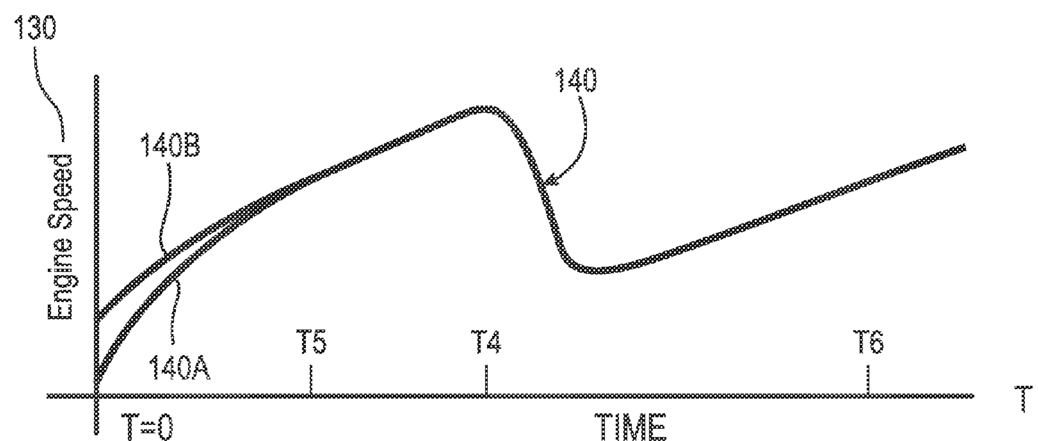
FIG. 3A is a graph showing engine rotational speed for engine start up; and, FIG. 3B is a graph showing accessory drive shaft speed for engine start up.

FIG. 3A is a graph showing example engine rotational speed for engine start up.

Figure 3B:
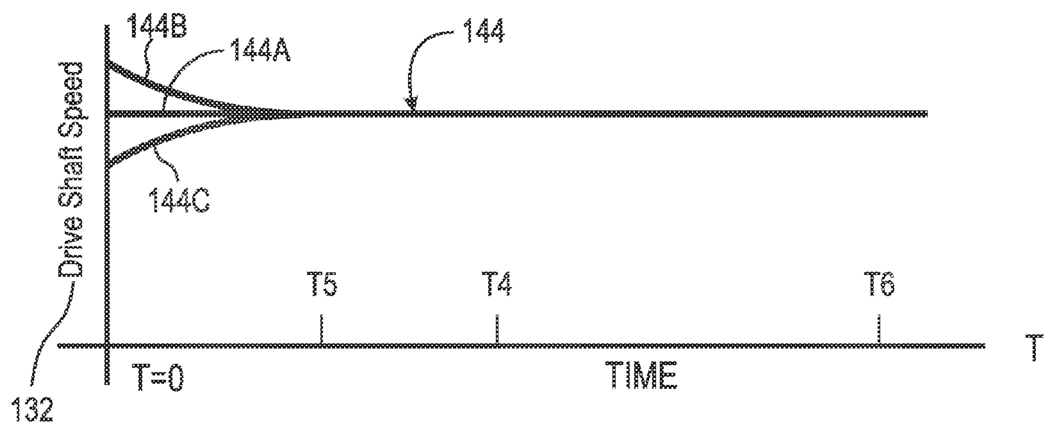

FIG. 3B is a graph showing example accessory drive shaft speed for engine start up. The discussion that follows is directed to an embodiment with clutches 112A and 128 (clutch 128 is closed), although is should be understood that the discussion is applicable to an embodiment including clutch 112B as well. FIGS. 3A and 3B illustrate an example situation in which engine 120 is turned off or is idling at a relatively low speed. Starting at T=0, engine 120 is accelerated either by turning on the engine or from an idle mode. The former case is shown by portion 140A of function 140 and the latter case is shown by portion 140B of function 140. Unit 122 is configured to open clutch 112A when rotational speed 130 is below threshold value 142. For example, speeds 130 below threshold value 142 are inadequate for properly powering accessories 104. In FIGS. 3A and 3B, from T=0 to T4, speed 130 for 140 is below threshold 142.

While clutch 112A is open, electric machine 108 is powering drive shaft 110. For example, portions 144A, 144B, and 144C of function 144 show instances in which speed 132 is substantially constant, decreasing, or increasing, respectively.

In an example embodiment, when drive shaft speed 132 is within predetermined range 127 of speed 130, unit 122 is configured to close clutch 112A to drive shaft 110 with crankshaft 118 or input shaft 114. From that point forward, operation is as described with respect to FIGS. 2A and 2B. In an example embodiment, at time T5 function 144 equals function 140 and unit 122 is configured to close clutch 112A to drive shaft 110 with crankshaft 118 or input shaft 114 at time T5.

In an example embodiment, unit 122 is configured to keep clutch 112A open until speed 130 stabilizes. For example, anticipating a gear shift, unit 122 keeps clutch 112A open past time T4 until speeds 130 and 132 are within range 127 or substantially equal, for example at time T6, at which point, unit 122 closes clutch 112A. In an example embodiment, unit 122 keeps clutch 112A open through a plurality of gear shifts.

Advantageously, the controlled switching of torque transmission to drive shaft 110 addresses the problems noted above regarding over-rotating of electric motor 108. That is, the ability to disconnect drive shaft 110 from crankshaft 118 and/or input shaft 114 during times of excessive acceleration or deceleration of crankshaft 118 and/or input shaft 114 enables a reduction in the capacity of the electric machine and subsequent decreases in battery and electronics requirements. In addition, belt tension requirements can be reduced. The preceding factors result in decreased cost and complexity and increased fuel efficiency.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What we claim is:

1. An accessories drive system for a vehicle, comprising:
- at least one accessory device; and,
- a clutch assembly including:
  - an electric machine;
  - a drive shaft connected to the electric machine and the at least one accessory device and arranged to provide torque to the at least one accessory device;
  - at least one clutch arranged to connect and disconnect the drive shaft with respect to:
    - an input shaft for a transmission for the vehicle; or,
    - a crankshaft for an engine for the vehicle; and,
  - at least one control unit, configured to:
    - connect, using at least one clutch, the drive shaft to the crankshaft or the input shaft;
    - rotate the drive shaft with the crankshaft or the input shaft;
    - disconnect, using the at least one clutch, the drive shaft from the crankshaft or the input shaft, respectively;
    - accelerate or decelerate, using the electric machine, rotation of the drive shaft at a first absolute rate less than a second absolute rate of acceleration of deceleration of the engine or the input shaft; and,
    - when a speed of rotation of the drive shaft is within a predetermined range of a speed of rotation of the crankshaft or the input shaft, close the at least one clutch to engage the drive shaft with the crankshaft or the input shaft.

2. The transmission accessories drive system of claim 1, wherein the at least one control unit is configured to:
- detect the second absolute rate of acceleration or deceleration; and,
- when the second absolute rate is greater than a threshold value, disconnect, using the at least one clutch, the drive shaft from the crankshaft or the input shaft.

3. The transmission accessories drive system of claim 1, wherein the at least one control unit is configured to:
- receive a gear shift signal from the transmission indicating initiation of a gear shift in the transmission; and,
- disconnect, using the at least one clutch, the drive shaft from the crankshaft or the input shaft in response to receiving the signal.

4. The transmission accessories drive system of claim 1, wherein the at least one control unit is configured to initiate a gear shift for the transmission after the disconnection of the drive shaft from the crankshaft or the input shaft or substantially concurrent with the disconnection of the drive shaft from the crankshaft or the input shaft.

5. The transmission accessories drive system of claim 4, wherein the at least one control unit is configured to complete the gear shift prior to closing the at least one clutch to engage the drive shaft with the crankshaft or the input shaft.

6. The transmission accessories drive system of claim 1, wherein the at least one clutch includes a first clutch arranged to connect the drive shaft with the crankshaft and disconnect the drive shaft from the crankshaft.

7. The transmission accessories drive system of claim 1, wherein the at least one clutch includes a first clutch arranged to connect the drive shaft with the input shaft and disconnect the drive shaft from the input shaft.

8. The transmission accessories drive system of claim 1, further comprising:
- a first clutch arranged to non-rotationally connect the crankshaft to the input shaft and disconnect the crankshaft from the input shaft.

9. An accessories drive system for a vehicle, comprising:
- at least one accessory device; and,
- a clutch assembly including:
  - an electric machine;
  - a drive shaft connected to the electric machine and the at least one accessory device and arranged to provide torque to the at least one accessory device;
  - at least one clutch arranged to connect and disconnect the drive shaft with respect to:
    - an input shaft for a transmission for the vehicle; or,
    - a crankshaft for an engine for the vehicle; and,
  - at least one control unit, configured to:
    - when a rotational speed for the engine is below a threshold value:
      - disconnect, using the at least one clutch, the drive shaft from the crankshaft or the input shaft; and,
      - rotate the drive shaft using the electric machine;
    - accelerate the engine; and,
    - when a speed of rotation of the drive shaft is within a predetermined range of a speed of rotation of the crankshaft or the input shaft, close the at least one clutch to engage the drive shaft with the crankshaft or the input shaft.

10. The transmission accessories drive system of claim 9, wherein the at least one control unit is configured to execute at least one gear shift after accelerating the engine and prior to the speed of rotation of the drive shaft being within the predetermined range of the speed of rotation of the crankshaft or the input shaft.

11. The transmission accessories drive system of claim 9, wherein the at least one control unit is configured to accelerate rotation of the drive shaft, using the electric motor, after accelerating the engine and prior to the speed of rotation of the drive shaft being within the predetermined range of the speed of rotation of the crankshaft or the input shaft.

12. The transmission accessories drive system of claim 9, wherein the at least one control unit is configured to decelerate rotation of the drive shaft, using the electric motor, after accelerating the engine and prior to the speed of rotation of the drive shaft being within the predetermined range of the speed of rotation of the crankshaft or the input shaft.

13. The transmission accessories drive system of claim 9, wherein the at least one control unit is configured rotate the drive shaft, using the electric motor, at a substantially constant rate after accelerating the engine and prior to the speed of rotation of the drive shaft being within the predetermined range of the speed of rotation of the crankshaft or the input shaft.

14. The transmission accessories drive system of claim 9, wherein the at least one control unit is configured to:

detect at a first point in time, the speed of rotation of the drive shaft being within the predetermined range of the speed of rotation of the crankshaft or the input shaft;

keep the drive shaft disconnected from the crankshaft or the input shaft;

detect at a second point in time, following the first point in time, the speed of rotation of the drive shaft being within the predetermined range of the speed of rotation of the crankshaft or the input shaft; and, close the at least one clutch to engage the drive shaft with the crankshaft or the input shaft.

15. The transmission accessories drive system of claim 9, wherein the at least one clutch includes a first clutch arranged to connect the drive shaft with the crankshaft and disconnect the drive shaft from the crankshaft.

16. The transmission accessories drive system of claim 9, wherein the at least one clutch includes a first clutch arranged to connect the drive shaft with the input shaft and disconnect the drive shaft from the input shaft.

17. The transmission accessories drive system of claim 9, further comprising:

a first clutch arranged to non-rotationally connect the crankshaft to the input shaft and disconnect the crankshaft from the input shaft.

18. An accessories drive system for a vehicle, comprising:

at least one accessory device; and, a clutch assembly including:

an electric machine;

a drive shaft connected to the electric machine and the at least one accessory device and arranged to provide torque to the at least one accessory device;

first and second clutches; and, at least one control unit, configured to:

accelerate rotation of the crankshaft;

connect, using the first clutch, the drive shaft to the crankshaft or the input shaft;

non-rotatably connect, using the second clutch, the crankshaft and the input shaft;

rotate, using the electric machine, the drive shaft with the crankshaft or the input shaft; and, detect a first absolute rate of acceleration or deceleration of the crankshaft rotation greater than a threshold value; or receive a gear shift signal from the transmission, wherein in response to detecting the first absolute rate of acceleration or deceleration of the crankshaft rotation greater than the threshold value, the at least one control unit is configured to:

disconnect the drive shaft from the crankshaft or the input shaft;

accelerate or decelerate, using the electric machine, rotation of the drive shaft at a second absolute rate less than the first absolute rate; and, when a speed of rotation of the drive shaft is within a predetermined range of a speed of rotation of the crankshaft or the input shaft, close the first clutch to engage the drive shaft with the crankshaft or the input shaft; or, wherein in response to receiving the gear shift signal, the at least one control unit is configured to:

disconnect the drive shaft from the crankshaft or the input shaft;

initiate the gear shift for the transmission;

accelerate or decelerate, using the electric machine, rotation of the drive shaft; and when a speed of rotation of the drive shaft is within a predetermined range of a speed of rotation of the crankshaft or the input shaft, close the first clutch to engage the drive shaft with the crankshaft or the input shaft.

19. The transmission accessories drive system of claim 18, wherein: in response to receiving the gear shift signal, the at least one control unit is configured to complete the gear shift prior to closing the first clutch to engage the drive shaft with the crankshaft or the input shaft.

20. The transmission accessories drive system of claim 18, wherein the clutch assembly includes a third clutch arranged to non-rotationally connect the drive shaft with the input shaft and disconnect the drive shaft from the input shaft.

* * * * *